(12) United States Patent
Sanz Ananos et al.

(10) Patent No.: US 10,751,946 B2
(45) Date of Patent: Aug. 25, 2020

(54) BUILD MATERIAL ANALYSIS

(71) Applicant: HEWLETT-PACKARD DEVELOPMENT COMPANY, L.P., Houston, TX (US)

(72) Inventors: Isabel Sanz Ananos, Sant Cugat del Valles (ES); Santiago Sanz Ananos, Sant Cugat del Valles (ES); Sergi Culubret, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 315 days.

(21) Appl. No.: 15/562,361

(22) PCT Filed: Jun. 19, 2015

(86) PCT No.: PCT/EP2015/063837
§ 371 (c)(1),
(2) Date: Sep. 27, 2017

(87) PCT Pub. No.: WO2016/202404
PCT Pub. Date: Dec. 22, 2016

(65) Prior Publication Data
US 2018/0050493 A1 Feb. 22, 2018

(51) Int. Cl.
*B33Y 70/00* (2020.01)
*B29C 64/393* (2017.01)
*B33Y 50/00* (2015.01)
*B29C 64/35* (2017.01)
*B33Y 10/00* (2015.01)
*B33Y 30/00* (2015.01)
*B33Y 50/02* (2015.01)
*B29C 64/153* (2017.01)

(52) U.S. Cl.
CPC .......... *B29C 64/393* (2017.08); *B29C 64/153* (2017.08); *B29C 64/35* (2017.08); *B33Y 10/00* (2014.12); *B33Y 30/00* (2014.12); *B33Y 50/00* (2014.12); *B33Y 50/02* (2014.12); *B33Y 70/00* (2014.12)

(58) Field of Classification Search
CPC ......... B33Y 10/00; B33Y 30/00; B33Y 50/02; B33Y 70/00; B29C 64/393; B29C 64/153
USPC ........................................................ 264/40.1
See application file for complete search history.

(56) References Cited

U.S. PATENT DOCUMENTS 7,589,868 B2   9/2009  Velde et al.
7,680,555 B2   3/2010  Dunn et al.
8,301,286 B2  10/2012  Babu et al.
(Continued)

FOREIGN PATENT DOCUMENTS

EP       2832475 A2  *  2/2015  ........... B23K 15/002
WO    WO-2014061024 A1 *  4/2014  ........... C23C 14/048
WO    WO-2015025171       2/2015

OTHER PUBLICATIONS

Lu, L., et al; "Layer-to-Layer Model and Feedback Control of Ink-Jet 3-D Printing"; Nov. 26, 2014; IEEE/ASME Transactions on Mechatronics.

*Primary Examiner* — Christina A Johnson
*Assistant Examiner* — Xue H Liu
(74) *Attorney, Agent, or Firm* — HP Inc. Patent Department

(57) ABSTRACT

According to one example there is provided a build material measurement module to determine build material characteristics from a build material to be analyzed.

20 Claims, 6 Drawing Sheets

(56) References Cited

U.S. PATENT DOCUMENTS

2014/0265049 A1   9/2014  Burris et al.
2015/0061170 A1*  3/2015  Engel ..................... B33Y 10/00
                                                            264/40.1

* cited by examiner

BUILD MATERIAL ANALYSIS

BACKGROUND

Additive manufacturing techniques, such as three-dimensional (3D) printing, enable objects to be generated on a layer-by-layer basis. 3D printing techniques may generate a layer of an object by selectively solidifying a portion of a layer of a build material.

The properties of a generated 3D object are linked to the properties of the build material used.

BRIEF DESCRIPTION

Examples will now be described, by way of non-limiting example only, with reference to the accompanying drawings, in which.

DETAILED DESCRIPTION

Figure 1:
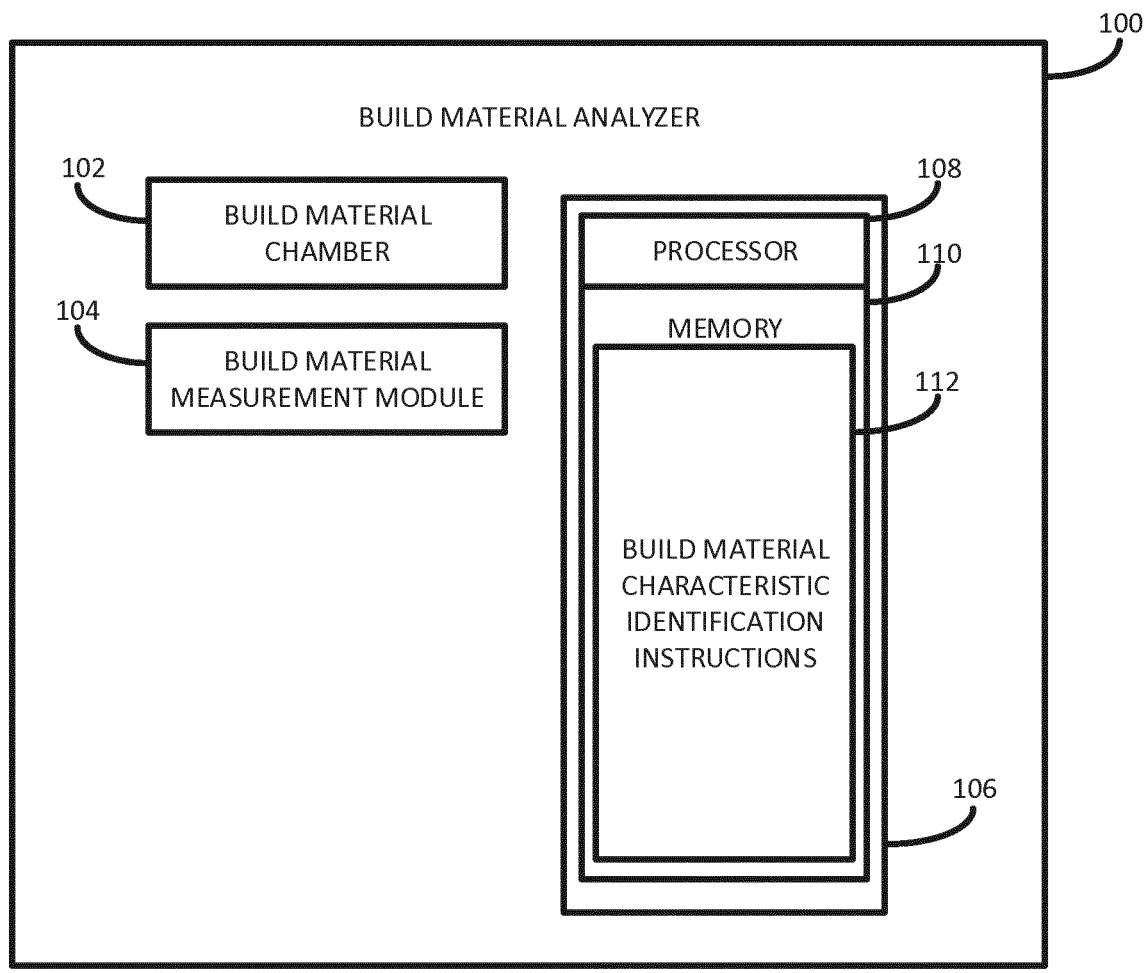
FIG. 1 is a block diagram of a build material analyzer according to one example.

Some 3D printing techniques selectively solidify portions of a layer of build material using various techniques. For example, some 3D printing systems selectively apply, for example using a printing mechanism, a coalescing or fusing agent on a layer of build material in a pattern corresponding to a layer of the object being generated. By applying energy to the whole, or a substantial portion, of the layer of build material those portions of the build material on which coalescing agent is deposited absorb sufficient energy to cause the temperature of those portions to rise such that coalescence, and subsequent solidification, of the build material occurs. Those portions of the build material on which no coalescing agent is deposited do not absorb sufficient energy to cause coalescence, and hence do not solidify.

Other 3D printing systems may apply a binder agent to a layer of build material to cause solidification of selective portions of build material. Yet other 3D printing systems may operate in a different manner.

The term 'build material', as used herein, refers to any material suitable for use by a 3D printer to generate 3D objects. The exact nature of the build material may be chosen based on criteria that may include, for example: the solidification mechanism used by the 3D printing technique used; and the intended properties of a generated 3D object. The term 'build material' is generally used herein to refer to unsolidified build material.

Some 3D printing systems use build material that have a powdered, or granular, form. According to one example a suitable build material may be a powdered semi-crystalline thermoplastic material. One suitable material may be Nylon 12, which is available, for example, from Sigma-Aldrich Co. LLC. Another suitable material may be PA 2200 which is available from Electro Optical Systems EOS GmbH.

In other examples other suitable build material may be used. Such materials may include, for example, powdered metal materials, powdered plastics materials, powdered composite materials, powder ceramic materials, powdered glass materials, powdered resin material, powdered polymer materials, and the like.

Fresh build material, i.e. build material which has not previously been used in a 3D printing process, may typically be chosen to have granular characteristics that comply with a chosen specification. For example, a 3D printer manufacturer may recommend use of build materials that have specific characteristics. For example, a fresh build material may be chosen to have an average grain size in the range of about 20 to 50 microns and to have a maximum grain size variation of less than about 10%. The build material supplier may have appropriate quality control systems in place to ensure that each batch of powdered build material is compliant with the chosen specification.

However, if users source build material from unreliable sources, the build material may have granular characteristics which do not comply with chosen specification.

Similarly, many 3D printing systems enable build material that remains unsolidified after the generation of a 3D object to be recovered to enable its reuse in the generation of subsequent 3D objects. This is typically referred to as build material recycling. Recovered build material may not be suitable for reuse directly, but may often be mixed with a proportion of fresh build material to help ensure that the characteristic of the mix comply with the chosen specification. However, for various reasons a mix of recovered and fresh build material may not comply with the chosen specification.

Being able to identify whether a build material intended to be used to generate a 3D object complies with a chosen specification is particularly useful since it enables numerous actions to be taken. For example, it may be used, amongst other things, to: prevent a 3D object from being generated; to limit functionality of a 3D printing system; to modify operating parameters of a 3D printing system such that a 3D object may be correctly generated; and to allow modifications to the build material to be made such that it does conform to a chosen specification.

According to various examples described herein, there is provided a system and method to verify characteristics of a build material intended to be used to generate a 3D object.

Referring now to FIG. 1, there is shown a block diagram of a build material analyzer 100 according to one example.

The analyzer 100 comprises a build material chamber 102 where a sample of a build material may be placed to enable a build material measurement module 104 to perform measurements on the sample of build material to enable characteristics of the sample of build material to be determined. Build material may be placed in the chamber 102 in any suitable way, for example manually by a user, or automatically through a suitable mechanical process.

The chamber 102 may take any suitable form. In one example, the chamber may be a support platform on which a layer of build material may be formed, for example using a build material distributor, such as a roller, a wiper, or any other suitable mechanism. In another example the chamber may be a container in which build material may be positioned and may comprise a transparent window portion through which the measurement module 104 may perform measurements on the build material.

In one example the build material measurement module 104 may comprise one or multiple height sensors that are capable of accurately determining small height differences from a surface of a layer of build material. For example, such a height sensor may be able to accurately measure differences in the order of a few hundred microns, with an accuracy of less than one microns. In other examples height sensors with other capabilities may be used. In this way, the height profile of a layer of build material may be determined, as will be described in greater detail below.

In one example, a height sensor used in the build material measurement module 104 may be an optical sensor based on commonly available, and relatively cheap, CD or DVD pickups. Such height sensors are generally well known and are suitable for accurately measuring small differences in height. In other examples, other kinds of sensors, such as laser sensors, may be used.

The analyzer 100 is generally controlled by a controller 106. The controller 106 comprises a processor 108 coupled to a memory 110. The memory 110 stores build material characteristic identification instructions 112 that, when executed by the processor 108, control the analyzer 100 to determine characteristics of a build material, as described herein.

Figure 2:
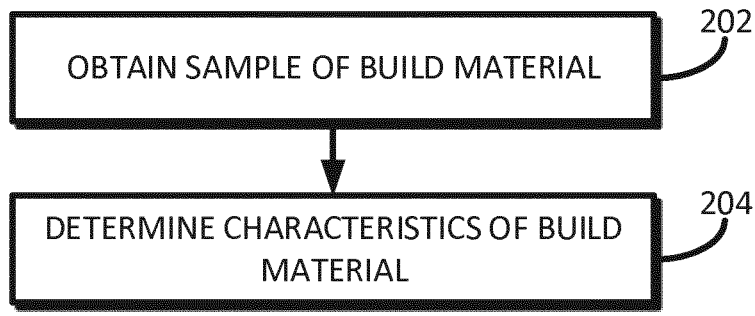
FIG. 2 is a flow diagram outlining an example method according to one example.
Figure 3:
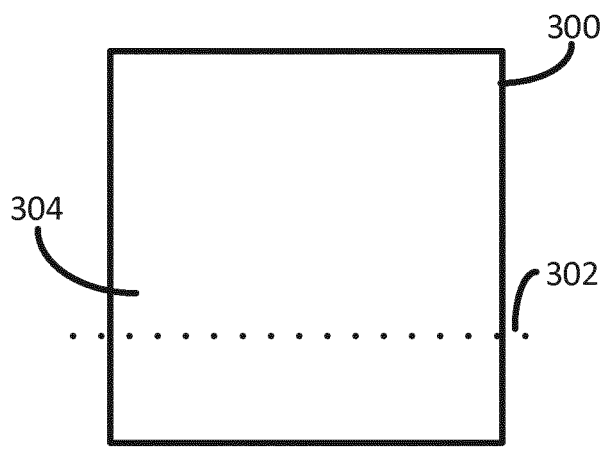
FIG. 3 is a plan view of a layer of build material according to one example.
Figure 4:
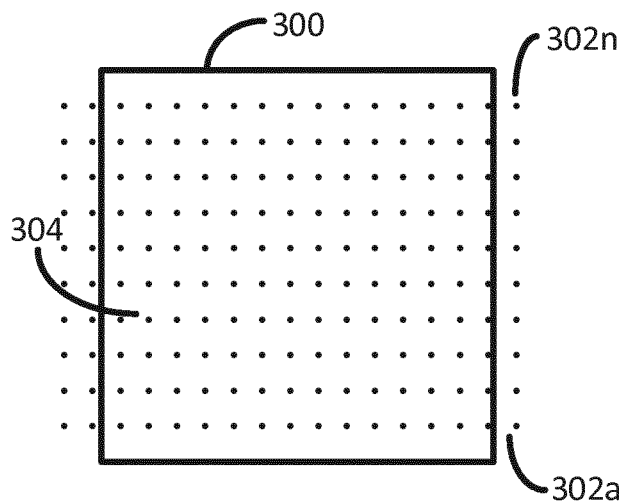
FIG. 4 is a plan view of a layer of build material according to one example.

Operation of the analyzer 100, according to one example, will now be described with additional reference to the flow diagram of FIG. 2 as well as FIGS. 3, 4, 5 and 6.

At 202, a sample of build material is positioned in the build material chamber 102. In one example, the controller 106 may control a build material distributor to form a layer 304 of build material on a suitable support platform, such as support platform 300 shown in FIG. 3.

At 204, the controller 106 controls the build material measurement module 104 to take measurements of the sample of build material. In one example, the controller 106 controls the build material measurement module 104 to take multiple height measurements along a line 302 (shown in FIG. 3) that traverses at least a portion of the layer 304 of build material. In one example the measurement module 104 and the chamber 102 may be arranged to allow relative movement there between. For example, the measurement module 104 may be installed on a movable carriage or other suitable movable structure. The spatial interval between separate height measurements may be any suitable distance. In one example the spatial interval may be between about 10 microns and 20 microns, although in other examples other spatial intervals may be used.

In another example, the controller 106 controls the build material measurement module 104 to take multiple height measurements along multiple lines 302a to 302n (shown in FIG. 4) that traverse the layer 304 of build material.

Figure 5:
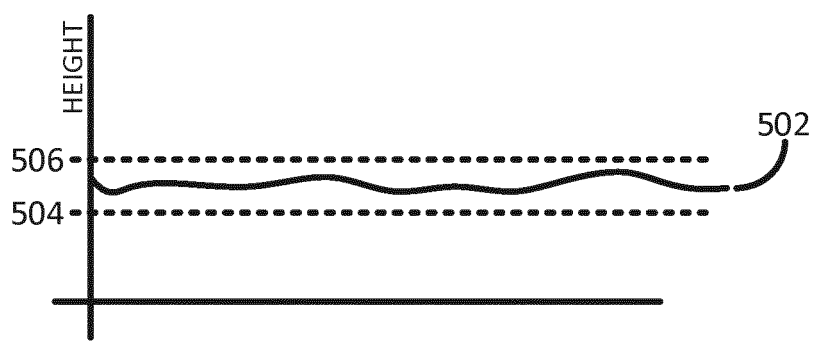
FIG. 5 is an illustration showing a height profile of a sample of build material according to one example.
Figure 6:
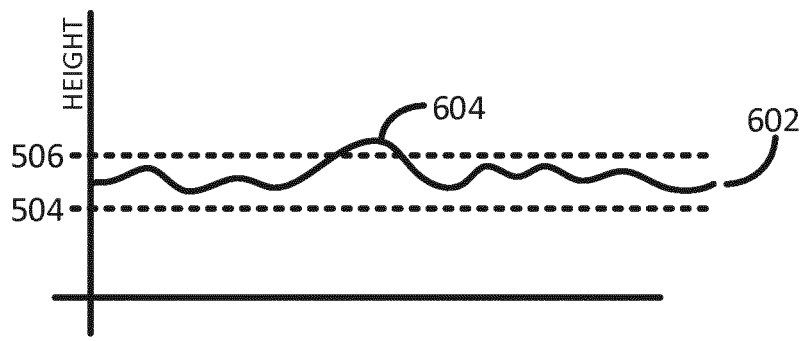
FIG. 6 is an illustration showing a height profile of a sample of build material according to one example.

By taking multiple height measurements along a line enables a height profile of the surface of the sample of build material to be determined, as illustrated in FIG. 5 by the line 502. A pair of reference lines 504 and 506 respectively illustrate acceptable upper and lower height limits of a chosen build material specification. As shown in FIG. 5, the height profile 502 is within the acceptable limits, and hence measurements obtained along the line 302 of the sample of build material 304 indicate that the build material complies with the chosen specification. As shown in FIG. 6, the height profile 602 has a portion 604 which is outside of the acceptable limits.

Taking height measurements along multiple lines of a sample of build material enables higher accuracy to be obtained, for example by increasing the quantity of build material from which measurements are taken.

At 204 the obtained height measurements are interpreted by the controller 106 to determine a set of characteristics of the build material. In one example the characteristics relate to the grain size of the build material. Referring back to FIGS. 5 and 6, the 'bumpy' nature of the height profiled 502 and 602 results from measurements taken from adjacent particles of powdered build material. As can be seen in FIG. 5, the particle sizes are generally of about the same size, whereas in FIG. 6 there is greater variation between particle sizes.

Where height measurements are taken along multiple lines 302a to 302n the multiple results may be interrupted together in any suitable manner.

The controller 106 interprets the height measurements to determine characteristics of the build material. For example, the controller 106 may determine, based on the measurements taken, the percentage of build material that is composed of particle sizes within a given range, and the percentage of build material that is composed of particle sizes outside of the given range.

The determined characteristics may be used in various ways, as described in further detail below.

Figure 7:
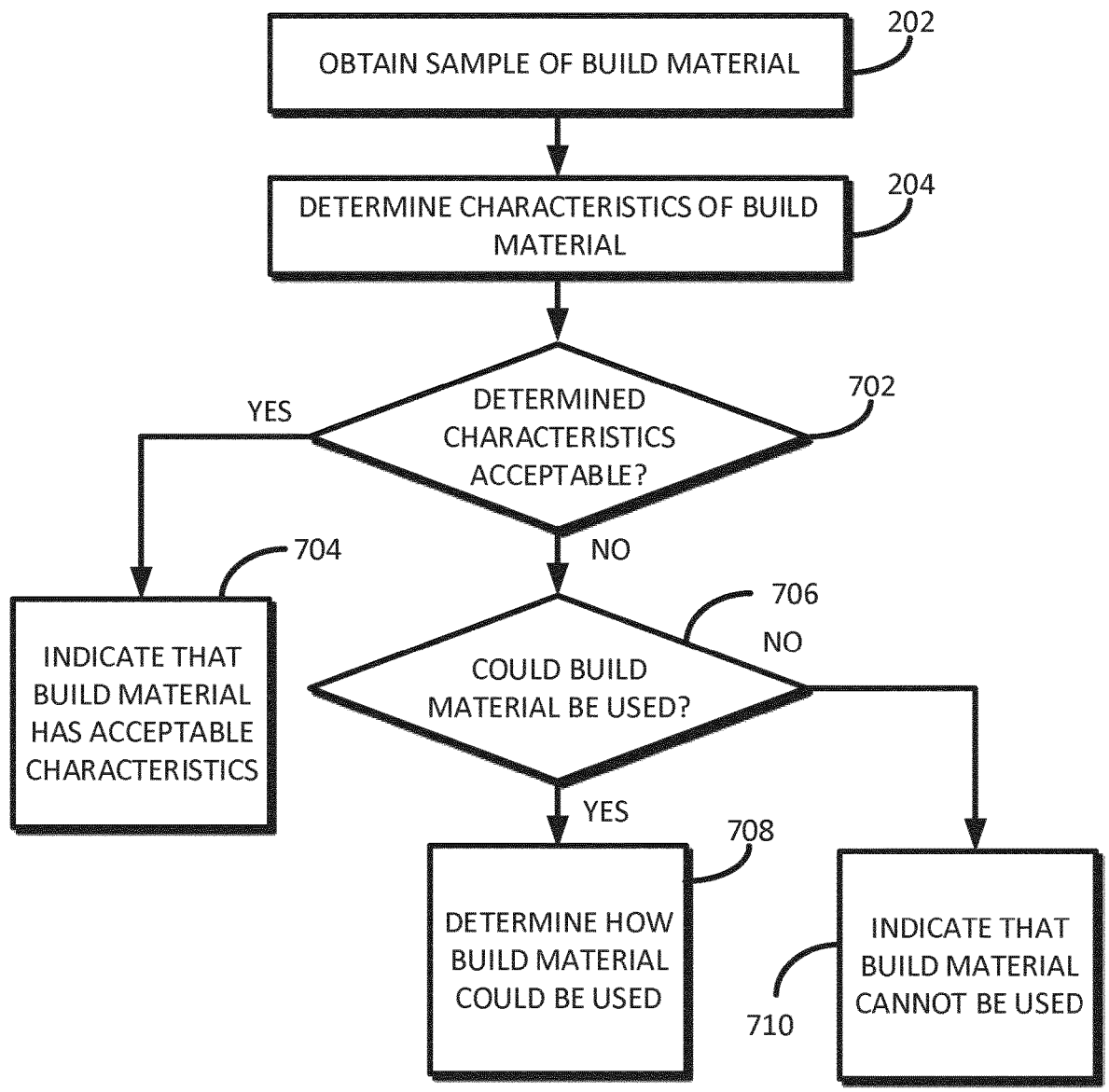
FIG. 7 is a flow diagram outlining an example method according to one example.

Referring now to the flow diagram of FIG. 7, the controller 106 initially performs the previously described blocks 202 and 204. At 702 the controller 106 determines whether the determined characteristics are acceptable. For example, the controller 106 may have a predetermined set of acceptable characteristics to which the determined characteristics are compared. In one example the predetermined set of acceptable characteristics may be related, for example, to the build material recommendations of a 3D printing system which is to use the build material being analyzed.

If, at 702, the controller 106 determines that the determined characteristics are acceptable at 704 the controller 106 indicates this is an appropriate manner. In one example, the controller 106 displays a message on a suitable user interface of the analyzer 100 to indicate that the determined characteristics are acceptable. In another example, the controller 106 may store appropriate data on a non-volatile memory associated with a container or build material module in which the build material is stored. The memory may be read, for example, by a 3D printing system prior to the build material being used to generate a 3D object.

If, at 702, the controller 106 determines that the determined characteristics are not acceptable, at 706 the controller 106 determines whether the build material could be used.

If, at 706, the controller 106 determines that the build material could be used, at 708 the controller 106 determines how the build material could be used If, at 706, the controller 106 determines that the build material cannot be used it indicates, at 710, that the build material cannot be used.

The manner in which the build material analyzer 100 is implemented may impact the determination, at 708, of how the build material could be used.

Figure 8:
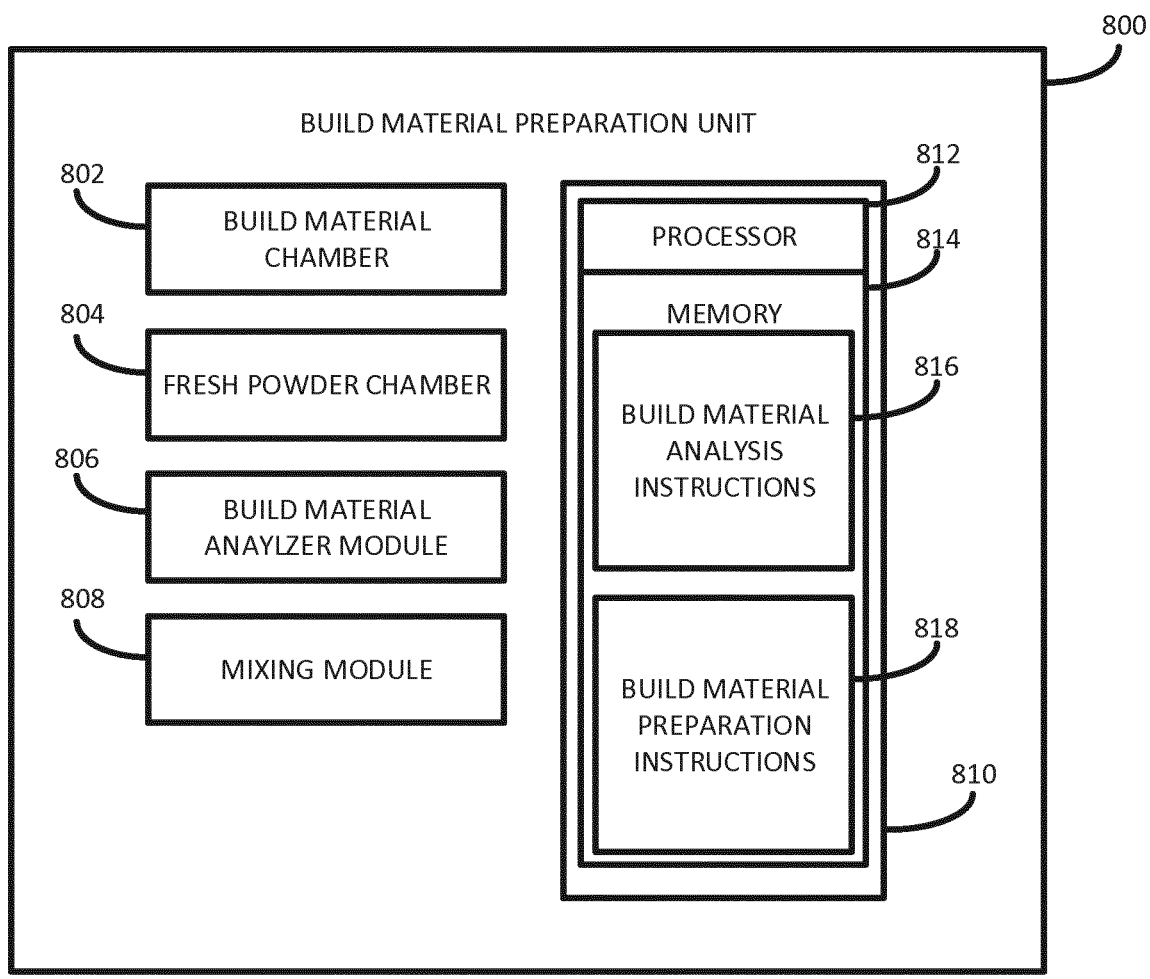
FIG. 8 is a block diagram of a build material preparation unit according to one example.

For example, in one example a build material analyzer, as described herein, may be implemented as part of a build material preparation unit, as illustrated in FIG. 8.

The build material preparation unit 800 comprises a first chamber 802 to receive build material that may, for example, have been previously used, but not solidified, in a 3D printing process.

The build material preparation unit 800 further comprises a second chamber 804 to receive, for example, fresh build material The build material preparation unit 800 further comprises a build material analyzer module 806 to determine characteristics of build material in a manner as described above. In one example the build material analyzer module 806 is arranged to determine characteristics of build material in the first chamber 802. In another example the build material analyzer module 806 may be arranged to determine characteristics of build material in both the first chamber 802 and the second chamber 804.

The build material preparation unit 802 also comprises a mixing module 808 to enable quantities of build material from the first and second chambers 802 and 804 to be mixed together is appropriate quantities.

Operation of the build material preparation unit 800 is generally controlled by a controller 810. The controller 810 comprises a processor 812, such as a microprocessor, coupled to a memory 814. The memory 814 stores build material analysis instructions 816 that, when executed by the processor 812, cause the processor 810 to determine characteristics of build material.

The memory 814 also stores build material preparation instructions 818 that, when executed by the processer 812, cause the processor 812 to prepare a mix of build materials from the first and second chambers that comply with a chosen specification.

In this way, the build material preparation unit 800 can be used, as outlined in the flow diagram of FIG. 7 to determine characteristics of a build material in the first chamber to determine, at block 702, whether the build material has acceptable characteristics. If, however, at block 702 it determines that the build material does not have acceptable characteristics, at block 706, the preparation unit 800 determines whether the build material could be used.

For example, the preparation unit 800 may determine that the build material could be used by mixing it with a percentage of fresh build material from the second chamber 804. For example, if the preparation unit 800 determines that the build material in the first chamber 802 comprises 15% of particles outside of the acceptable range, and the acceptable limit of particles outside the acceptable range is 5%, the preparation unit 800 determines a quantity of fresh build material to be mixed with the build material to generate a mix of build material having acceptable characteristics. The mixing module 808 may then be controlled to generate an acceptable build material mix. In one example the amount of fresh powder used may be determined based additionally on the determined characteristics of the fresh powder.

Figure 9:
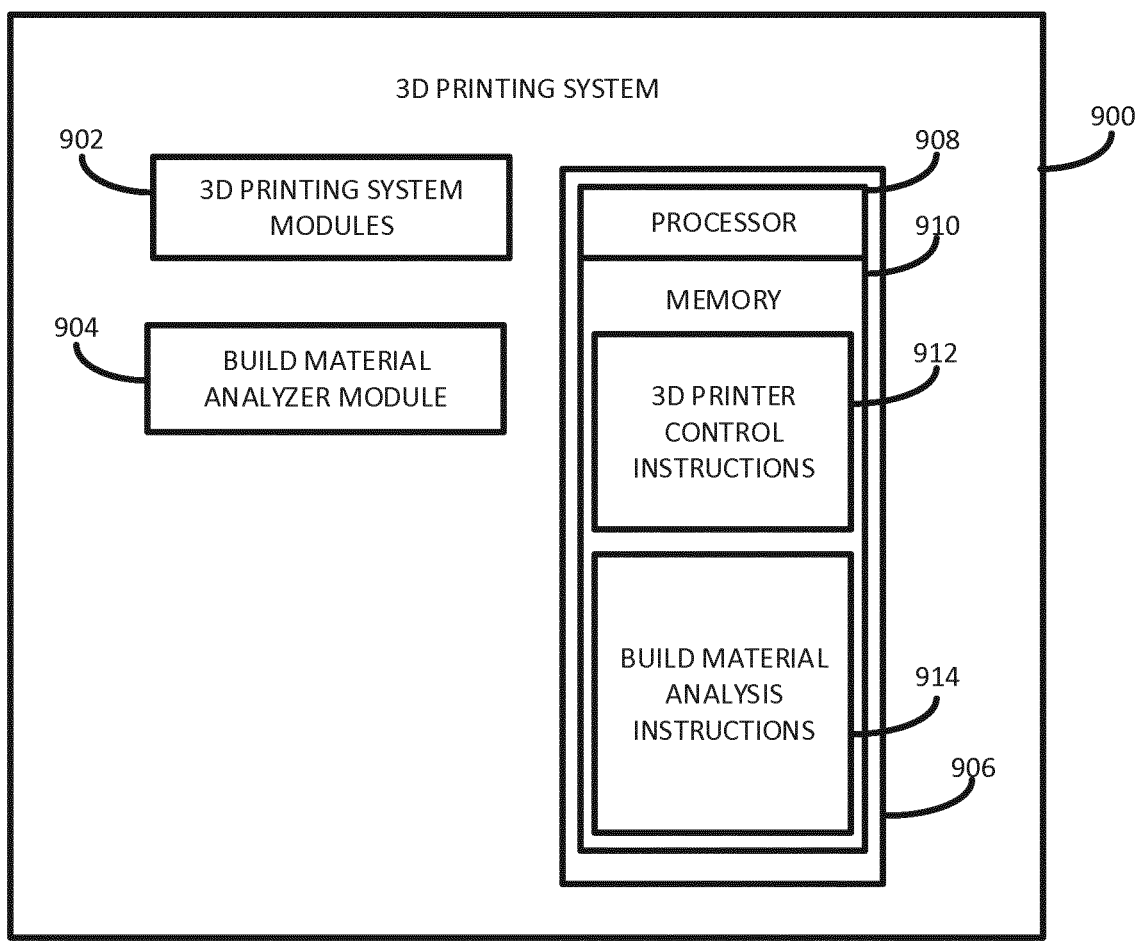
FIG. 9 is a block diagram of a 3D printing system according to one example.

In another example, as illustrated in FIG. 9, a build material analyzer, as described herein, may be implemented in a 3D printing system 900.

The 3D printing system 900 comprises a set of 3D printing system modules 902. Depending on the type of 3D printing system, the 3D printing system modules 902 may include any one or more of: a build module; a build material store; a build material distributor; an agent distributor; an energy source.

The printing system 900 also comprises a build material analyzer module, for example as described herein.

Operation of the 3D printing system 900 is generally controlled by a controller 906. The controller 906 comprises a processor 908, such as a microprocessor, coupled to a memory 910. The memory 910 stores 3D printer control instructions 912 that, when executed by the processor 908, cause the processor 908 to control operation of the 3D printing system 900. The memory 910 also stores build material analysis instructions 914 that, when executed by the processor 908, cause the build material analyzer module 904 to determine characteristics of build material to be used to generate a 3D object.

In this way, the build material analyzer module 904 can be operated as outlined in the flow diagram of FIG. 7 to determine, at block 702, whether the build material to be used by the 3D printing system has acceptable characteristics. If, however, at block 702 the analyzer module 904 determines that the build material does not have acceptable characteristics, at block 706, the controller 906 determines whether the build material could be used.

For example, the analyzer module 904 may determine that the build material can be used under certain conditions, such as for generating a 3D object using a 'draft' or a low quality output, or for 3D objects that do not have specific strength or other characteristics. The determination may be made, for example, based on experimental or test data stored in a look-up table. For example, if a build material is determined to have from 20% to 30% of particles outside of the acceptable range the analyzer module 904 may limit the 3D printing system from printing in a 'low' to 'medium' quality print mode, and for a build material having from 30% to 40% of particles outside of the acceptable range may limit the 3D printing system from printing in a 'low' quality print mode. In other examples, other functional limitations or ranges may be used.

In another example, the analyzer module 904 may determine that the build material can be used if modifications to one or multiple operating parameters of the 3D printing system 900 are modified. For example, since larger particles may take a longer time to fully coalesce or melt, the analyzer module 904 may increase the amount of energy applied or the length of time that is energy is applied during a fusing phase of a 3D printing operation. In another example, the analyzer module may determine that an increased amount of fusing agent should be applied prior to a fusing phase of a 3D printing operation. Modifications to operating parameters may be made, for example, based on experimental or test data stored in a look-up table.

In a yet further example, the build material analyzer module 904 in the 3D printing system 900 may not comprise any height sensors, but may analyze data that is stored on a memory of, or is otherwise associated with, a build material container. For example, the data may be stored on the memory of a build material container by a build material preparation unit as described herein.

The invention claimed is:

1. A build material analyzer comprising:
   a build material measurement module to determine build material characteristics from a sample of a build material to be analyzed, the build material measurement module comprising an optical pickup operated as a height sensor to measure a height of the sample of build material disposed in the module;
   a processor to:
   determine whether the build material has acceptable characteristics based on output of the build material measurement module; and
   either indicate that the build material has acceptable characteristics or determine if the build material could be used by a 3D printing system to generate a 3D object.

2. The build material analyzer of claim 1, wherein the processor is to control the height sensor to take measurements from the build material sample and to determine from those measurements grain sizes of the build material sample.

3. The build material analyzer of claim 1, wherein the processor is to store, on a memory associated with the build material, details of determined characteristics of the sample of build material as determined by the build material measurement module.

4. The build material analyzer of claim 1, wherein the build material analyzer is integrated into a build material processing unit having a first chamber to receive a first build material previously used in a build operation and a second chamber to receive a second build material that has not been used in a previous build operation.

5. The build material analyzer of claim 4, wherein the build material processing unit comprises a mixing module, and wherein the processor is to:
determine a quantity of build material from the first chamber to be mixed with a quantity of build material from the second chamber such that a generated build material mix has acceptable characteristics; and
to control the mixing module to generate a mix of the determined quantities of build material.

6. The build material analyzer of claim 1 wherein the build material analyzer is integrated into a three-dimensional printing system.

7. The build material analyzer of claim 6, wherein the processor is to determine, based on the determined characteristics, whether the build material may be used by the 3D printing system.

8. The build material analyzer of claim 7, wherein the processor is to limit functionality of the 3D printing system based on the determined characteristics.

9. The build material analyzer of claim 7, wherein the processor is to determine modifications to an operating parameter of the 3D printing system based on the determined characteristics.

10. The build material analyzer of claim 1, wherein the processor is to operate the height sensor to measure a height profile of the sample of build material along a line crossing the sample of build material.

11. The build material analyzer of claim 10, wherein the processor compares the height profile to upper and lower limits to determine whether the height profile has any portion thereof outside the upper and lower limits.

12. The build material analyzer of claim 1, wherein the processor is to operate the height sensor to measure a height profile of the sample of build material along multiple lines crossing the sample of build material.

13. A three-dimensional printing system comprising:
a build material measurement module to determine build material characteristics from a sample of a build material, the build material measurement module comprising an optical pickup operated as a height sensor to measure a height of the sample of build material disposed in the module; and
a processor to:
obtain characteristics of a build material to be used to generate a three-dimensional object from the build material measurement module;
determine whether the build material has a predetermined characteristic; and
where it is determined that the build material does not have a predetermined characteristic, modify operation of the three-dimensional printing system based on the obtained build material characteristics.

14. The three-dimensional printing system of claim 10, wherein the controller is to limit functionality of the three-dimensional printing system based on the obtained characteristics.

15. The three-dimensional printing system of claim 13, wherein the controller is to modify an operating parameter of the three-dimensional printing system based on the obtained characteristics.

16. The three-dimensional printing system of claim 13, wherein the processor is to increase an amount of energy or fusing agent applied or a processing time of the three-dimensional printing system when the build material is determined not to have the predetermined characteristic.

17. The three-dimensional printing system of claim 13, wherein, when the build material is determined not to have the predetermined characteristic, the processor is to utilize that build material only when the printing system is operating in a decreased print quality mode.

18. The three-dimensional printing system of claim 17, further comprising a lookup table specifying ranges of percentages of particles outside of an acceptable size range that limit the printing system to a medium quality print mode and to a low quality print mode.

19. A method of determining characteristics of a build material for use in a three-dimensional printer, comprising:
receiving a sample of a build material;
taking multiple height measurements from a surface of the build material to determine a height profile of the build material; and
determining from the multiple height measurements data relating to the grain sizes of the build material.

20. The method of claim 19, further comprising a range of acceptable particle grain size, wherein when the build material is determined to have a percentage of grain size outside the range, the method further comprises utilizing that build material only when the printer is operating in a decreased print quality mode.

\* \* \* \* \*